INVENTOR
Robert Schilling
BY C. H. Dibbe
ATTORNEY

June 16, 1959 R. SCHILLING 2,890,895
REAR SPRING SUSPENSION FOR VEHICLES
Filed Dec. 31, 1953 2 Sheets-Sheet 2
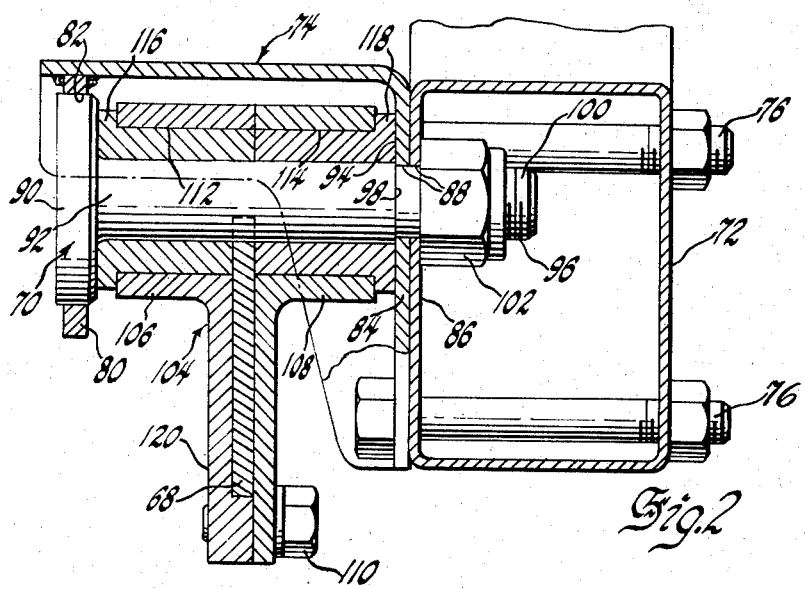
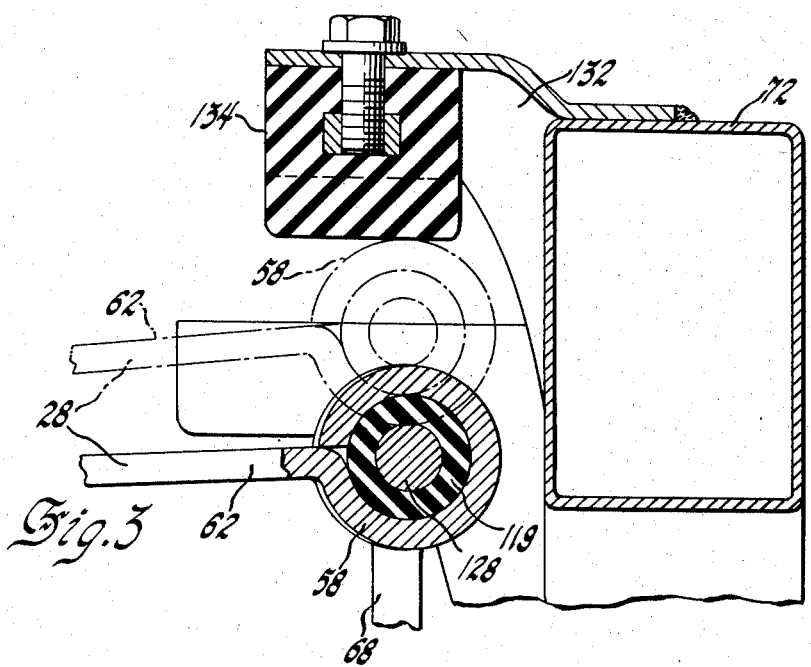
INVENTOR
Robert Schilling
BY
C. F. Dibble
ATTORNEY

United States Patent Office 2,890,895
Patented June 16, 1959

2,890,895

REAR SPRING SUSPENSION FOR VEHICLES

Robert Schilling, Bloomfield Hills, Mich., assignor to General Motors Corporation, Detroit, Mich., a corporation of Delaware Application December 31, 1953, Serial No. 401,541

4 Claims. (Cl. 280—104)

This invention relates to vehicle spring suspension and particularly to leaf spring suspension for rear wheels of a vehicle.

As is well known, the use of longitudinal leaf springs for cushioning relative displacement of the frame and axle of a vehicle has the additional advantage of providing optimum lateral stability therebetween. However, under certain circumstances, as for instance when the power plant is disposed between the rear wheels, basic chassis requirements dictate unusually wide lateral spacing between the individual springs. In such instances, it has been found that excessive roll stiffness occurs which adversely affects the steerability of the vehicle in turns. Roll stiffness and the accompanying undesirable handling characteristics in turns may also result when short stiff springs are employed, even though the springs are closely spaced laterally. In order to permit the use of either or both widely spaced springing or springs of comparatively high inherent stiffness, it is desirable that means be provided to reduce roll stiffness sufficiently to obtain normal steerability in turns. However, in providing a satisfactory solution to the problem it is of primary importance that the lateral stiffness inherent in leaf springs be retained. While the prior art is replete with devices capable of reducing roll stiffness in spring layouts of the types referred to, heretofore such devices have tended to adversely affect inherent lateral stiffness.

An object of the present invention is to provide a leaf spring suspension having means associated therewith for reducing roll stiffness without affecting lateral stiffness.

Another object is to provide a rear wheel suspension having widely spaced apart single leaf springs which are relatively short and stiff, the said springs being operatively connected with the vehicle chassis in a manner providing normal roll stiffness while retaining optimum lateral stiffness.

A further object is to provide a suspension of the type described wherein one end of each of the springs is operatively connected to a transverse beam pivotally secured to the vehicle chassis, the beam being adapted to swingably respond to rise and fall of the spring and to longitudinally flex in response to variations in linear distance between the opposite ends of the spring resulting from variation in load thereon.

These and other objects and advantages of the invention will become more readily apparent as reference is had to the accompanying specification and drawings wherein:

Fig. 2 is an enlarged sectional elevational view of the balance beam pivot assembly looking in the direction of arrows 2—2 of Fig. 1, and Fig. 3 is an enlarged sectional elevational view looking in the direction of arrows 3—3 of Fig. 1 showing the buffer assembly in its relationship with the spring and beam connection.

Figure 1:
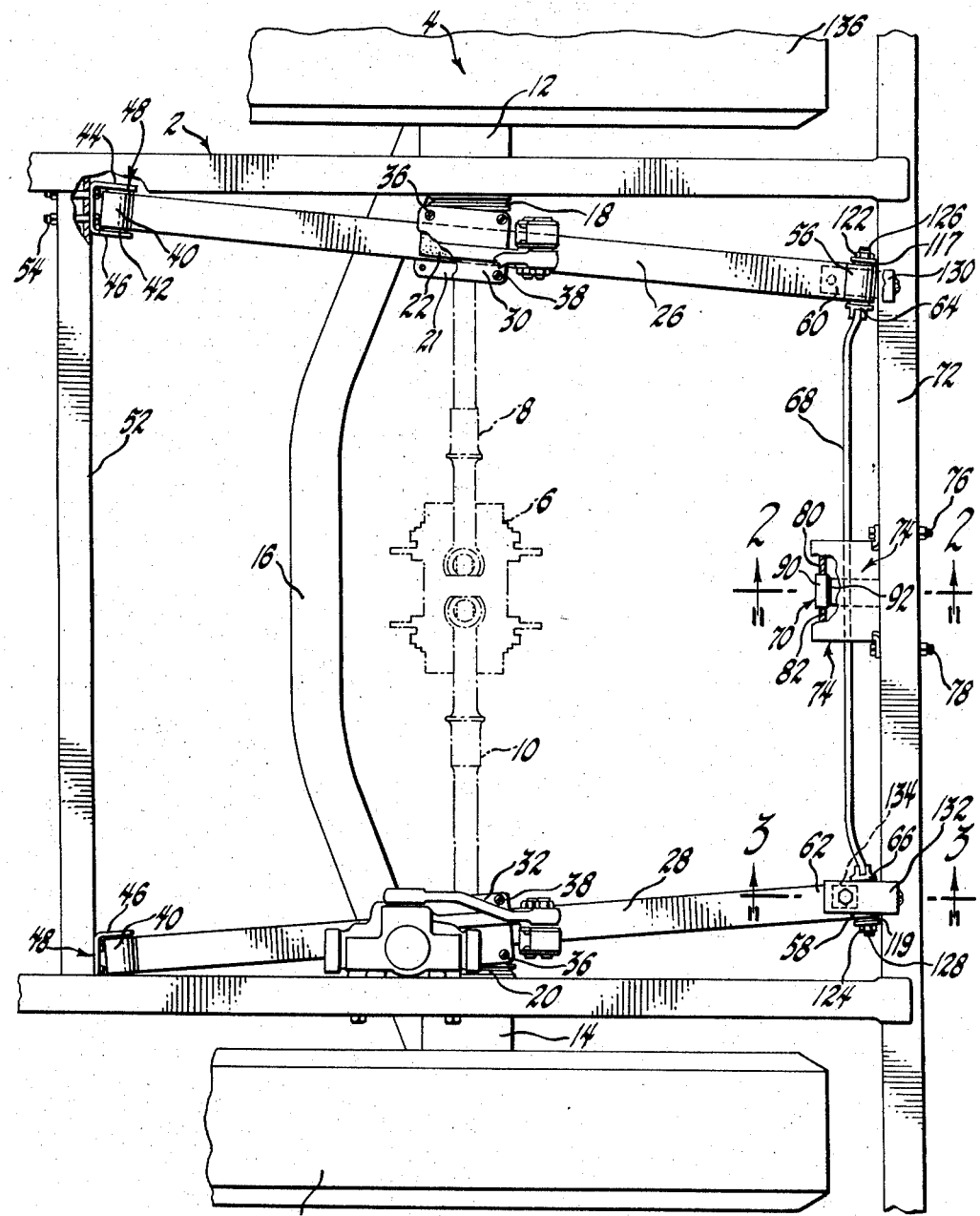
Fig. 1 is a fragmentary plan view of the rear portion of a vehicle chassis showing the construction and relative arrangement of the various parts of the invention.

Referring now to the drawings and particularly Fig. 1, there is illustrated a portion of a vehicle chassis 2 having DeDion drive wheel assembly 4 disposed in conventional relation therewith. Since the drive train proper forms no part of the invention, the differential 6 and half axles 8 and 10 are represented schematically only. The DeDion assembly 4 comprises annular wheel carrying members 12 and 14 which are rigidly retained in axially aligned laterally spaced apart relation by means of a transversely extending integral bowed tubular element 16. On the upper surface of the inner ends 18 and 20, of wheel carrying members 12 and 14, respectively, there are provided spring seats 21 which are adapted to receive the mid-portions of laterally spaced apart longitudinally extending single leaf springs 26 and 28. Springs 26 and 28 are secured to seats 21 by means of spring seat clamps 30 and 32 which overlie the upper surface of the springs. Clamps 30 and 32 are threadably connected to seats 21 by means of machine screws 36 and 38 which respectively straddle springs 26 and 28. To permit slight flexibility between the springs and the clamps, rubber pads 22 are preferably disposed on the upper and lower surfaces of the springs. Upon tightening screws 36 and 38, pads 22 and springs 26 and 28 are compressibly secured in the position shown in Fig. 1.

At their forward ends springs 26 and 28 are formed with eyes 40 which are adapted to surround transversely extending pivot shafts 42 carried between the parallel opposed walls 44 and 46 of brackets 48. Brackets 48, in turn, are bolted in spaced apart relation to a frame cross member 52 as by bolts 54. Because of the splayed, or rearwardly converging, arrangement of springs 26 and 28, the walls 44 and 46 of shackles 48 are angled inwardly slightly, as shown.

In accordance with the present invention, the eyes 56 and 58 formed at the rear ends 60 and 62 of springs 26 and 28 are adapted to surround shafts 64 and 66 formed at the opposite ends of a balance beam 68. Balance beam 68 is generally a rectangular blade-like member mounted at its mid-portion for pivotal movement in a vertical plane about a trunnion 70 which is disposed laterally mid-way on the forward surface of rear frame cross member 72. As seen best in Fig. 2, a box member 74 is secured by bolts 76 and 78 on the front vertical surface of cross member 72 to provide a support for trunnion 70. The front vertical wall 80 of box member 74 is provided with a relatively large diameter aperture 82 while the rear wall 84 and abutting forward wall 86 of cross member 72 are provided with aligned reduced apertures 88. Trunnion 70 is provided with a circular head portion 90 of a diameter substantially equivalent to aperture 82 and has a main body portion 92 which extends rearwardly to the forward surface 94 of wall 84. The terminal end 96 of trunnion 70 is reduced in diameter to provide shoulder 98 and is threaded at 100. After installation, as shown in Fig. 2, a machine nut 102 is drawn up to retain the trunnion 70 against axial movement in box member 74. To rotatably mount balance beam 68 for swingable movement about trunnion 70, there is provided a beam carrier member 104. Member 104 is formed in two parts 106 and 108, which are coupled by bolts 110. Parts 106 and 108 are provided with longitudinally directed bores 112 and 114 which are axially aligned and adapted to receive a pair of reversely similar bushings 116 and 118. Bushings 116 and 118 in turn rotatably embrace body portion 92 of trunnion 70. Depending portion 120 of part 106 is transversely slotted to receive balance beam 68 which extends transversely thereof and is rigidly retained between parts 106 and 108 and by the clamping action of bolts 110.

To eliminate rattling between spring eyes 56 and 58 and shafts 64 and 66 and prevent transmission of road noises, resilient bushings 117 and 119 are interposed between eyes 56 and 58 and shafts 64 and 66. Nuts 122 and 124 are then threadably disposed over threaded end portions 126 and 128 to secure the members in assembled relation.

Mounted on cross member 72 in vertical alignment with the opposite ends of balance beam 68 are a pair of buffer assemblies comprising press formed box members 130 and 132 to which are threadably secured depending rubber bumper elements 134. Bumpers 134 limit the vertical travel of the rear ends of springs 26 and 28 and the opposite ends of balance beam 68 connected thereto.

In order that the invention may be more readily understood, a description of the mode of operation will be given. Under normal conditions of straight line travel, the chassis is unaffected by centrifugal force, consequently springs 26 and 28 react to vertical load on frame 2 in the same manner as would be the case if both ends of each spring were shackled to the frame in the conventional manner. However, by virtue of the balance beam ararngement, when the vehicle is traveling in a curved path, as in turning a corner, the effective resistance to body roll of each of the springs 26 and 28 is reduced to slightly less than half the roll resistance of similar springs shackled at both ends. With the present invention only the forward half of each spring 26 and 28 functions to resist roll, since any load impressed upon either the rear half of springs 26 and 28 by body roll is immediately counteracted by swinging of balance beam 68. By way of example, assume that the vehicle is traveling in a clockwise circular path. Because of the effect of centrifugal force, the right side of the vehicle frame 2 will raise while the left side is depressed. Thus in effect, the frame inclines counter-clockwise about a longitudinal axis, as viewed from the rear. Since under normal conditions the axle 16 remains parallel with the road surface, balance beam 68 will also be maintained in a substantially horizontal plane. Inasmuch as the rear ends of the springs 26 and 28 are not connected to the frame, counter-clockwise inclination of the latter will neither relieve nor increase the normal load stresses thereon. Conversely, because the forward halves of each spring are positively secured between the frame and the axle, counter-clockwise inclination of the frame will directly impose increased load on one and decreased load on the other. In practice it has been found the rubber pads 22 not only aid in reducing transmission of road noises but also provide a sufficiently resilient connection between the spring seats 21 and springs 26 and 28 to permit slight flexing therebetween. In addition the axle may rotate a few degrees in either direction from normal which tends to slightly decrease the roll stiffness attributable to the forward halves of the springs. The mode of operation of the invention in reducing roll stiffness may also be illustrated by assuming that the frame 2 remains level while the wheels 136 and 138 move, respectively, up and down. Thus, if the right rear wheel 136 is raised, spring 26 will be compressed to a more nearly flat plane, causing spring eye 56 to simultaneously rise and travel rearwardly. As a result of upward movement of spring eye 56, balance beam 68 is caused to swing clockwise about trunnion 70 while the right end thereof simultaneously flexes rearwardly to compensate for the rearward movement of eye 56. Thus, progressive variations in the length of spring 26 are absorbed by horizontal flexing of the right half of beam 68, while vertical displacement of spring 26 induces swinging movement of the entire balance beam. As the right end of the beam 68 swings upwardly, the left end thereof swings downwardly and compresses opposite spring 28 which, in turn, forces wheel 130 downwardly. Thus, any given amount of movement of rear spring 26 is simultaneously accompanied by a corresponding downward movement of spring 28. Because the opposite ends of the balance beam also rise and fall, respectively, a corresponding amount, the rear halves of each spring offers no resistance to roll. Since only the forward halves are effective, roll stiffness is reduced approximately one half. It will, of course, be understood that when the left-rear wheel 138 is raised, the operation of the device is identical but in a reverse sense. In practice it has been found that this construction reduces roll stiffness and provides the desired steering characteristics in turns, yet does not adversely affect the lateral stiffness inherent in conventional leaf springing. Because of the retention of optimum lateral stiffness it has been found that an auxiliary lateral stabilizer is unnecessary.

While but a single embodiment of the invention has been shown and described, it will be apparent that other changes and modifications may be made therein. It is, therefore, to be understood that it is not intended to limit the invention to the embodiment shown, but only by the scope of the claims which follow.

I claim:

1. In a vehicle suspension, a frame having cross members, an axle having road wheels supported thereon, a pair of semi-elliptical leaf springs extending longitudinally of said vehicle and being connected at their mid-portions to said axle, means pivotally connecting one end of each of said springs to said frame, and a transversely extending beam dimensioned in cross section so as to be substantially flexible horizontally and substantially rigid vertically, said beam being pivotally secured for pivotal movement in a vertical plane at its mid-portion to one of said frame cross members and having its opposite ends directly pivotally connected to the other ends of said springs, said beam being adapted to swingably respond to vertical movement of either of said springs and to flex horizontally in response to variations in the effective length of said springs.

2. In a vehicle having a frame, a transversely extending axle supporting road wheels adjacent each side of the vehicle, single leaf springs extending longitudinally of the vehicle between said frame and said axle, each of said springs being disposed adjacent the lateral extremities of said axle, pivotal connections securing one end of each of said springs to said frame, and additional means directly pivotally connected to the other ends of each of said springs, said additional means comprising a transverse single leaf spring mounted intermediate its ends on a horizontally disposed pivot on said frame, the major cross sectional dimension of said transverse spring extending in a vertical plane whereby said spring is adapted to horizontally flex to permit variations in the effective length of said longitudinal springs resulting from rise and fall of said road wheels.

3. In a vehicle having a frame and a transversely extending axle supporting road wheels adjacent each side of the vehicle, single leaf springs extending longitudinally of the vehicle between said frame and said axle, each of said springs being disposed adjacent the lateral extremities of said axle, pivotal connections securing one end of each of said springs to said frame, additional means providing a common pivotal connection for the other ends of said springs with said frame, said additional means comprising a transverse spring mounted intermediate its ends on a horizontally disposed pivot on said frame, said transverse spring being flexible in a horizontal plane and substantially inflexible in a vertical plane, and means directly pivotally connecting each end of said transverse spring to the adjacent leaf spring on a transverse axis.

4. Spring suspension for a motor vehicle having a frame and driving wheels rotatably supported on a transversely extending axle, said suspension comprising a pair of laterally spaced longitudinally extending leaf springs secured to said axle and having transversely directed spring eyes at each end thereof, each spring being oriented so that the principal plane of deflection thereof extends substantially vertically, a transverse leaf spring extending between the rearward ends of said longitudinal springs, said transverse spring being oriented so that its principal plane of deflection extends substantially horizontally, means pivotally connecting the center of said transverse spring to said frame on a longitudinally extending horizontal axis, a pivot shaft rigidly connected to said transverse spring at each end thereof and extending into the rearward eye of the adjacent longitudinal spring, and a frame mounted pivot shaft extending through the forward eye of each longitudinal spring.

References Cited in the file of this patent

UNITED STATES PATENTS

| | | |
|---|---|---|
| 1,311,061 | Fey | July 22, 1919 |
| 1,860,831 | Bell | May 31, 1932 |
| 1,890,892 | Aflague | Dec. 13, 1932 |
| 2,002,459 | Viviano | May 21, 1935 |
| 2,166,456 | Oster | July 18, 1939 |